Figure 1:
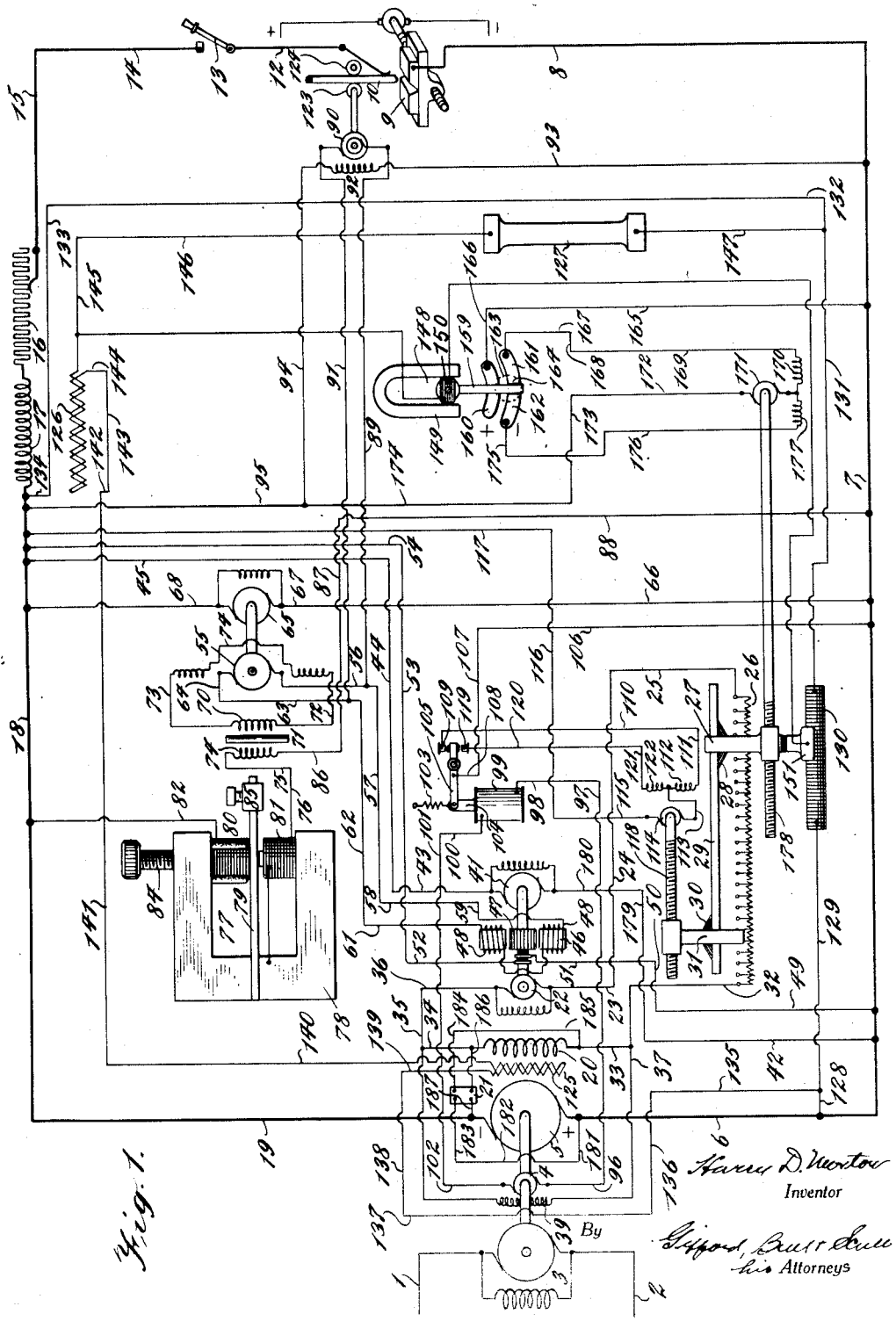

Feb. 12, 1924.
H. D. MORTON
1,483,612
APPARATUS FOR WELDING AND METHOD OF OPERATING THE SAME
Filed Nov. 17, 1922      2 Sheets-Sheet 2
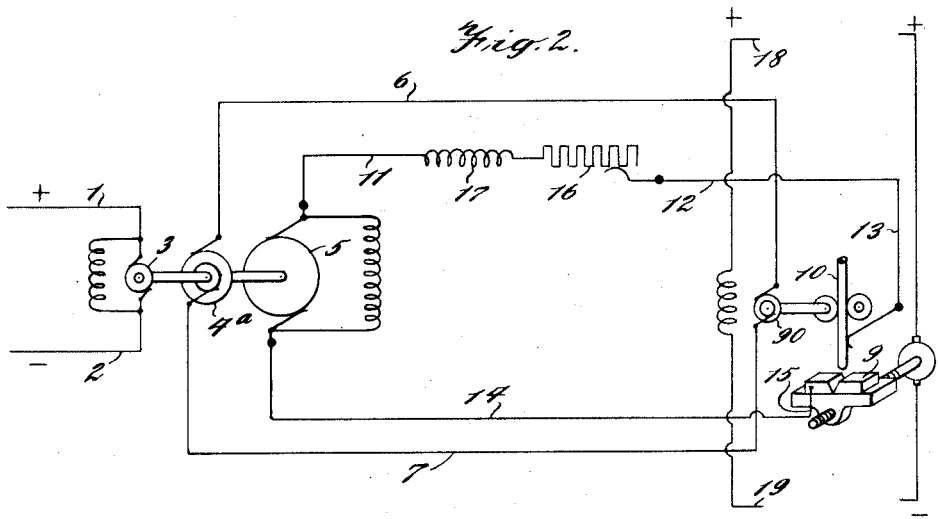
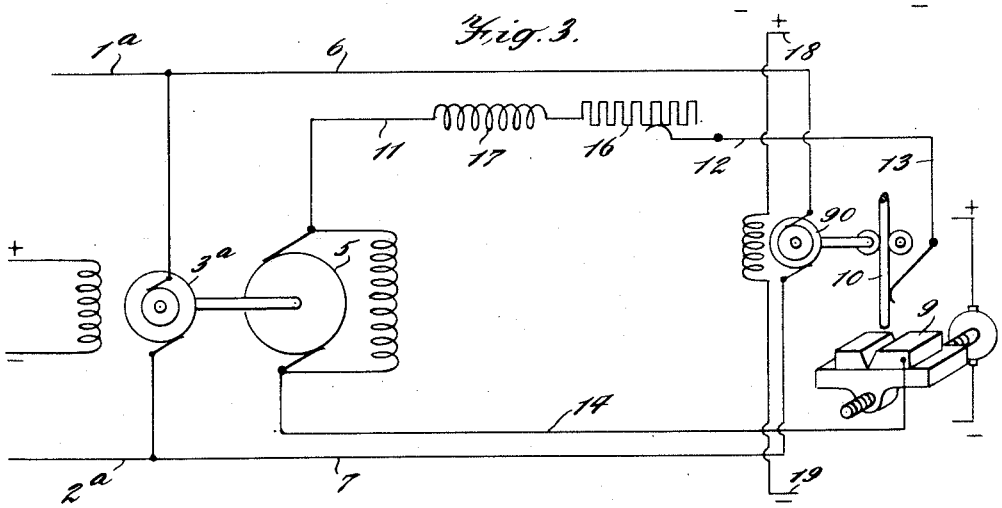
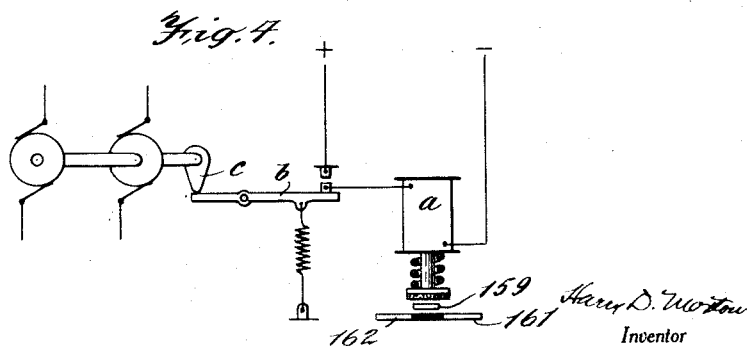

Patented Feb. 12, 1924.

1,483,612

UNITED STATES PATENT OFFICE.

HARRY D. MORTON, OF NEW YORK, N. Y.

APPARATUS FOR WELDING AND METHOD OF OPERATING THE SAME.

Application filed November 17, 1922. Serial No. 601,475.

*To all whom it may concern:*

Be it known that I, HARRY D. MORTON, a citizen of the United States, residing at New York, borough of Manhattan, in the county of New York and State of New York, have invented certain new and useful Improvements in Apparatus for Welding and Methods of Operating the Same, of which the following is a specification.

This invention relates to electric arc welding of that form wherein a metallic welding strip is automatically fed to supply metal to be fused by the arc and deposited upon work moving relatively thereto. It has for its object the provision of a new and improved method of controlling the arc whereby it is rendered adaptable to such welding, even of very thin metal at high speeds, while at the same time minimizing atmospheric oxidation and nitrogenization of the molten metal by restricting to narrow limits variations in the arc length. Atmospheric oxidation is apparently due to lengthening of the arc and consequent partial rupture of a protective envelope of inert gases which seems to surround a short high current arc and protect the metal thereof from atmospheric action. The inclusion of iron oxide and iron nitrides largely destroys the ductility and tensile strength of the weld. Hence a control of the arc which will maintain this protective envelope is important.

In a prior application, Serial No. 264,927, filed December 2, 1918, I have disclosed a practical form of semi-automatic tool adapted to be moved over the work, but having a variable speed electrode feed controlled by variations in the arc. This tool is highly useful for welding metal of three-sixteenths to one-quarter inch thickness and upward, but I have found that for very thin metal, for example #16 to #20 gauge, it does not, up to now, operate equally or even comparably well.

In my Patent No. 1,392,436, issued October 4, 1921, I have shown means for feeding the welding strip at a constant rate, and regulating and maintaining the arc by changing the voltage of the circuit, and thus varying the wattage at the arc. While this method of control also works satisfactorily for slowly-moving heavy work, it is not so well adapted for welding light metal at high speed of the work and welding strip.

In the welding of thin metal at high speed, the regulating of the arc offers much greater difficulties. Also the conditions imposed are in all respects more severe. The metal being thin is easily melted through and the material thus ruined; roughness in the work is of relatively greater consequence to the availability of the finished product; and the speed of welding must be much greater both for economic reasons and to avoid burning through.

These conditions require particularly exact regulation of arc energy and instantaneous correction of arc conditions to compensate for high relative speed of the work past the arc, and, at the same time, the requirements as to uniformity of work are more rigorous, thereby further accentuating the exactness of control required. I have found that it is extremely difficult to maintain a stable arc by changing the rate of feed of a constantly fed electrode, under these conditions—owing, apparently, to the inevitable delay between the instability and the action of the mechanism to correct it; and this tends to produce extinction or short circuit or hunting, with attendant irregularity of work and danger of burning or melting through the work. Even if the mechanism be made with extremely light moving parts, or employs, in addition, sensitive and high-speed relays, it is difficult to secure the desired perfection of stability control, under the special conditions of high-speed, thin metal work. It will not do to obtain merely average correction by over-correcting at relatively long intervals, if the desired results are to be obtained; but, in this class of work, practically instantaneous corrections of the proper amount must be occurring continuously, owing to the high speed of the work and the welding-strip. Thus it will not do for the corrective action to be appreciably out of phase with the arc variations.

The conditions in an arc having a rapidly consumed electrode continuously and rapidly fed toward the work (which is also rapidly moving relative to the arc) are essentially different from those in an arc having substantially stationary or even slow-moving electrodes. In the latter case it is merely necessary to have a sufficient series resistance and circuit voltage so that the change in voltage drop proportional to change of current, due to the ballast resistance, is in excess of that changing inversely with the current, due to the arc, in order to have a reasonable stability of the arc. Such an arc may have a voltage at the arc varying over a wide range with satisfactory stability, if only the circuit voltage is sufficiently in excess of the arc voltage, and the greater this excess the more stable and satisfactory is the arc operation. I find that the conditions governing the welding arc under consideration are entirely different. When heavy metal is welded and the amount of metal to be melted is considerable, the arc crater is relatively large, and this of itself seems to result in an approximation to steady conditions such as exist in a carbon arc with substantially fixed conditions. The high-speed arc on thin metal, however, always works under relatively unstable or transient conditions, due to the continued rapid feeding of the electrode and work.

With a homogeneous electrode of a given size, fed at a given speed, there will be a definite rate of energy which must be supplied, corresponding to each speed, if the arc is to be maintained of constant length. Also a given rate of movement of the arc and work, relative to one another, requires an additional rate of energy supply proportional to the rate of feed and cross-section of the work being welded.

In order that the weld may escape damaging oxidation, I find that the arc must be short and "fat," i. e. have a very high current density; and in welding one-sixteenth inch sheets with a round welding-strip three thirty-seconds inch in diameter, I have obtained strikingly good results with an arc only about one-sixteenth inch in length and a current as high as 150 amperes, a current density of over 20,000 amperes per square inch. Such a current is considerably above the fusing current of the wire, and is only possible in view of the high speed at which the wire travels.

It is evident that the maintenance of so short an arc when one electrode is rapidly moving toward the other is a matter of extreme difficulty and wholly impossible if there is appreciable delay in the operation of the corrective means. I find that the arc can, in fact, only be maintained by corrective changes in the rate of energy supplied, viz., the wattage. It has commonly been assumed that an automatic increase of current in a welding arc which was growing shorter increased the rate of fusion and thus counteracted the shortening tendency by faster consumption. I have found, however, that this is not true, and that, on the contrary, an increasing current may, and under commonly practiced welding, always does represent a decrease in fusing energy. In automatic welding at high speed under such conditions, the electrode is rapidly brought into contact with the work, the arc extinguished, and the work spoiled. Conversely, a decreasing current following a lengthening arc may not mean a decreased rate of fusion of the electrode, thus tending to correct the change; but may mean an increase of energy tending to accelerate the lengthening and rupture of the arc.

Under other conditions I find that an increase of current does tend to compensate for a shortening arc and a decrease of current does tend to correct for a lengthening arc, by increasing or reducing consumption of the welding-strip relative to its feeding rate. This anomalous behavior seems to indicate that it is the total power expended in the arc and its terminals which governs, although it is not clear why this should be the case in view of the ordinary theory of the arc which assumes a fixed electrode drop and that the variation in voltage occurs in the arc stream. I find that if the resistance of the circuit external to the arc absorbs more and the arc less than one-half the circuit voltage, whatever the latter may be, a decreasing arc length is accompanied by an actual decrease of arc wattage, although the current actually increases, and that the apparent compensatory action is not real or positive and helpful, but negative and destructive to the arc. If, however, the arc voltage is greater than one-half the circuit voltage, then a shortening arc results in an increase of both current and power, and does produce a positive and helpful compensatory action. I find further that this condition is not inconsistent with stability of the arc, that is to say, the arc does not extinguish due to its negative characteristic, even though the drop in the resistance is very much less than the total arc voltage.

To make a weld between lapped edges of metal of a certain thickness, for example, under definitely fixed conditions, a certain quantity of power is required. I find that for a proper amount of self-compensatory action, it is also necessary that the power change per volt change of arc voltage should be equal to a certain amount, characteristic of the metal employed and the rate of welding. If the circuit voltage is too high relative to the power consumption of the arc, it may not be possible to select any value of arc voltage, between one-half and full circuit voltage, which will give the necessary rate of change of power per volt. The circuit voltage also must not be too low, for a given arc voltage, as the change of wattage per volt change at the arc may then be too great for the feeding rate and an irregular hunting action may ensue, or the arc be extinguished. In other words, the arc length and the electrode feeding speed should be selected so that with a high current density in the welding wire, the wattage, with what may be called normal conditions, will just serve to fuse the wire as fast as it is fed. The circuit resistance and voltage should then be made such that the increase in arc wattage for a decrease in arc length, or the decrease in arc wattage due to an increase in arc length, will automatically restore the normal length.

I have also discovered that this self- compensatory action is most marked with a short, high-current arc of low voltage; and that above about twenty volts at the arc, with the materials I have used, its character changes and it is much less uniform in action, and the deposition of metal tends to become irregular. This further emphasizes the desirability of a short arc.

I have found, for example, that a welding arc of 16 volts or lower, having the electrode fed at a constant speed and the circuit resistance chosen to give a circuit voltage materially less than twice the arc voltage, with a high current density, and adjusted to give a correct rate of change of arc wattage per volt change in arc voltage, will operate entirely automatically with the work moving relative to its at a high rate of speed, and maintain a substantially constant arc length, since changes in length are instantly compensated for by changes in the rate of fusion; and that such an arc will deposit metal with a smoothness comparable to liquid applied with a brush and without burning the thin material being welded. The metal is then deposited as a nearly smooth, slightly raised welt, along the line of weld. For example, I have used a circuit voltage of about twenty volts, an arc voltage of about sixteen volts, a current of 135 amperes, a feed of the welding-strip of about one-quarter inch per second, and a relative travel of the weld of three-quarters inch per second.

To accomplish this result it is desirable to back the metal oposite the arc with a suitable chill which should be cooled by water or otherwise to prevent any excessive rise in temperature.

Such entirely automatic welding may be conducted indefinitely so long as the speeds and circuits conditions are constant or nearly so, but considerable changes in voltage or feeding speeds call for a readjustment of conditions. While some variation in voltage is permissible, it is highly desirable that it be quickly corrected, or that the feeding speed of the welding strip should definitely vary with it. Any suitable means may be employed to accomplish these results.

In Fig. 1 I show a welding system for insuring the maintenance constant or substantially constant of the impressed voltage of the welding circuit, under conditions of variations in generator speed and generator temperature; the maintenance constant or substantially constant of the rate of welding strip feed; and for preventing or compensating for variations in the resistance of the welding circuit external to the arc.

In Fig. 2 I show a modification wherein the rate of welding strip feed is correlated to the speed of the welding generator.

In Fig. 3 I show still another system, wherein changes in the potential of the welding circuit, due to variations in generator speed, may be prevented.

In Fig. 4 I show in detail means associated with the relay 148 of Fig. 1 for alternately opening and closing a circuit for energizing and de-energizing motor 171.

I provide, in the system shown in Fig. 1, means for insuring that the potential of the welding current shall be constant under the conditions of variations in generator speed and generator temperature; that the rate of welding strip feed shall be constant; that variations in the resistance of the welding circuit external to the arc shall be prevented in so far as is possible, and that, where the conditions are such that changes in resistance due to heating are difficult of prevention, that they shall be compensated for. I accomplish these results in the following manner:

Variations in welding generator speed and temperature are prevented from affecting the potential of the welding current by automatically increasing or decreasing the amount of resistance in series with the welding generator field, to neutralize the effect of such speed and temperature changes. Variations in the resistance of the welding circuit external to the arc, due to temperature changes, are prevented by using cables of such capacity that the heat of resistance is radiated as rapidly as it is generated; and by employing as stablizing resistance an alloy having a temperature coefficient of resistance of practically zero. I compensate for temperature changes in resistance of the reactance 17 by causing such temperature changes to automatically and correctively alter the potential of the welding current. I insure against variations in the rate of welding strip feed by driving the feeding means with a synchronous motor. The operation of this system is as follows:

Current from the mains 1 and 2 drives the motor 3 of the motor-generator set. Motor 3 drives the speed-corrective generator 4 and the welding generator 5. The welding generator delivers current to the welding circuit as follows: from the positive pole of the generator to line 6, line 7, line 8, the work 9, between which and the welding-strip 10 an arc is adapted to be struck, welding-strip 10, line 12, switch 13, line 14, line 15, stabilizing resistance (of the constant temperature coefficient type) 16, reactance 17, line 18, line 19, to negative pole of generator 5. When the motor-generator set is started, the field 20 of the welding generator 5 is self-excited, current from the positive pole being delivered by lines 181, 182 and 183, through one side of the no-load release switch 21, line 184, line 185, to one terminal of the field winding 20 through the said field winding 20 to line 186, through the other side of no-load release switch 21 and line 187 to the negative pole of generator 5. Upon current being delivered to the welding circuit, the motor 41 receives current as follows: from the positive line 7, line 42, line 179, line 180, through the motor 41, line 43, line 44, and line 45 to the negative line 18—thereby driving the motor 41, which, in turn, drives the generator 22, which supplies current at constant potential to the following circuit: from one pole of generator 22, line 23, line 24, line 25, through resistance 26, contactor 27, brush 28, rail 29, brush 30, contactor 31, through resistance to line 32, line 37, line 33, to one terminal of the field winding 20, through field winding 20, line 34, line 35, and line 36 to the opposite pole of generator 22. The flow of current from the generator 22 causes the no-load release switch 21 to operate to open the circuit whereby the welding generator 5 furnished current for self-excitation, and thereafter the welding generator has its field separately excited from the constant potenial generator 22. In shunt to the field winding 20 is the field winding 39 of the speed-corrective generator 4, whereby said generator field is separately excited from the constant potenital generator 22, thus rendering its voltage proportional to its speed. The generators 22 and 4 are of ample capacity to prevent undue heating.

In order to insure that the speed of the generator 22 and consequently its voltage shall be constant, there is mounted on the shaft by which said generator is driven the synchronous regulator 46, comprising the armature 47 and a plurality of field coils 48. Direct current is supplied to the armature 47 through the following circuit: positive line 7, line 49, line 50, line 51 to slip-ring electrically connected to the armature 47, through said armature, through slip-ring electrically connected to the armature, line 52, line 53, line 54, to negative line 18. Alternating current is supplied to the field coils 48 of the synchronous regulator 46 from a source to be hereinafter described.

The speed-corrective generator 4 operates as follows: From one pole of its armature current is delivered through line 96, line 97, line 98, winding of solenoid 99, line 100, line 101, line 102, to the opposite pole of the armature of generator 4. The generator 4 being separately excited from a constant potential source, the current delivered to the solenoid winding will be proportional to the speed of the armature of the generator 4, i. e. to the speed of the welding generator 5. Upon a tendency toward an increase in speed of the welding generator 5 and the speed-corrective generator 4, the pull of the solenoid 99 (which is opposed by spring 103) will be increased, the plunger 104 will be lowered in the solenoid core, and the upper contact of switch lever 105 will close the following circuit: positive line 7, line 106, line 107, line 108, switch lever 105, terminal 109, line 110, line 111, motor field winding 112, line 113, armature of motor 114, line 115, line 116, line 117, to negative line 18. Thereupon the motor 114 will rotate in such a direction that the lead-screw 118 will, through a threaded portion of the contactor 31, move said contactor to the right, as shown in the diagram, thereby increasing the resistance in series with the field 20 of the welding generator 5—whereby, in spite of the increase in generator speed, the E. M. F. applied to the welding circuit will be prevented from rising. Conversely, if for any reason the speed of the welding generator 5 and of the speed-corrective generator 4 should tend to decrease, the operation will be as follows: Less current will be delivered by the speed-corrective generator 4 to the winding of solenoid 99, and the spring 103 will bring the switch lever 105 into contact with the terminal 119, closing the following circuit: positive line 7, line 107, switch member 105, terminal 119, line 120, line 121, motor field winding 122, line 113, armature of motor 114, line 115, line 116, line 117, to negative line 18. Thereupon the motor 114 will rotate in the opposite direction, moving the contact 30 to the left as shown in the diagram, and reducing the resistance in series with the field 20 of the welding generator 5—whereby, in spite of the decrease in generator speed, the E. M. F. applied to the welding circuit will be prevented from dropping.

The means for preventing a change in wattage available at the arc, due to heating of the field winding 20 of the welding generator 5, and due to the heating of reactance 17, in series with the arc, are as follows:

Inside the field winding 20 is the non-inductively-wound resistance wire 125, and inside the winding of reactance 17 is the non-inductively-wound resistance wire 126. These heat-variable resistances are in series in one leg of a Wheatstone bridge circuit, and balanced against them in the other leg of the circuit is the fixed resistance 127, which is of constant temperature coefficient material. Also in said circuit is the slide wire resistance 130. Current from the positive line 6 is delivered to the Wheatstone bridge circuit as follows: line 128, line 129, slide wire resistance 130, line 131, line 132, line 133, line 134, to negative line 18. A portion of the current also flows through the following circuit: line 135, line 136, line 137, line 138, line 139, resistance 125, line 140, line 141, line 142, line 143, line 144, resistance 126, line 145, line 146, fixed resistance 127, line 147, line 132, line 133, line 134, to negative line 18. It will be understood that with the resistances 125 and 126 at ordinary temperature, the shoe 151 is so adjusted with reference to the slide wire resistance 130 that no current will flow through the movable coil relay 148. However, as soon as the resistance of the non-inductive winding 125 tends to change as a result of heating due to the rise in temperature of the field winding 20 of the welding generator 5, and as soon as the resistance of the non-inductive winding 126 tends to change as a result of the heating due to the rise in temperature of the coil of reactance 17, current will flow through the armature 150 of the relay 148 in one direction. The relay 148 is provided with a permanent field in the form of the magnet 149. Its armature carries the vane 159, which moves freely over the positive contact plate 160 and the negative contact plates 161 and 162. The vane is periodically brought into contact with the plate 160 and the insulation 164 or the plate 161 or 162, by the action of the plunger of a solenoid, which plunger is indicated in Fig. 1 by the dotted circle 163. Referring to Fig. 4: The coil $a$ of this solenoid is alternately energized and de-energized by the automatic opening and closing of a switch $b$, actuated by a cam $c$ or other suitable mechanism, mounted upon the shaft of one of the continually-operating motors in the system. The device so operates that a spring, opposing the pull of the solenoid, depresses the vane 159, bringing it into contact with the plate 160 and the insulation 164 or the plate 161 or 162; and upon the energizing of the solenoid coil $a$ the pressure upon the vane 159 is removed, and the vane is free to respond to the movement of the armature 150.

Under normal conditions, the vane 159 does not close a circuit, because its lower end contacts with the insulation 164, between the negative plates 161 and 162. When, however, due to the increase in resistance of the non-inductive windings 125 and 126, current flows through the winding of the relay armature 150, in one or other direction, the armature revolves slightly, say in a clockwise direction, closing the following circuit: positive line 7, line 165, line 166, positive contact plate 160, vane 159, negative contact plate 162, line 175, line 176, motor field 177, armature of motor 171, line 173, line 174, line 95, to negative line 18. Thereupon the motor 171 rotates, driving the lead-screw 178, which, coacting with a threaded portion of the contactor 27, moves said contactor to the right as shown in the diagram, thereby reducing the resistance 26 in series with the field winding 20 of the welding generator 5, thus preventing a decrease in E. M. F. applied to the welding circuit, by reason of the increase in resistance of the field winding 20 due to heating; and increasing the E. M. F. applied to the welding circuit to compensate for the increase in resistance of the reactance 17, thus maintaining constant the wattage available at the arc.

Simultaneously with the movement of the contactor 27 along the rail 29, to decrease the resistance in series with the field 20 of the welding generator 5, the shoe 151 moves to the right along the slide-wire resistance 130, thus establishing a new neutral point at which current will cease to flow through the armature 150 of the relay 148, bringing the vane 159 back to the neutral point, where its lower end contacts with the insulation 164. The circuit of the motor 171 is thus broken, and the motor stops.

If, for any reason, the temperature and therefore the resistance of the non-inductive windings 125 and 126 should decrease, current will flow through the armature winding 150 in the opposite direction, causing the armature to revolve slightly in a counter-clockwise direction, whereby the vane 159 closes the following circuit: positive line 7, line 165, line 166, positive contact plate 160, vane 159, negative contact plate 161, line 167, line 168, line 169, motor field 170, through armature of motor 171, line 172, line 173, line 174, line 95, to negative line 18. Thereupon the motor 171 rotates in a direction to cause the lead-screw 178 to carry the contactor 27 to the left, as shown in the diagram, thus increasing the resistance in series with the field winding 20 of the welding generator 5, and preventing a rise in the E. M. F. applied to the welding circuit by reason of the decrease in resistance of the field winding 20, and also preventing an increase in the wattage available at the arc by reason of the decrease in resistance of the winding of reactance 17.

Simultaneously with the movement of the contactor 27 along the rail 29, to increase the resistance in series with the field 20 of the welding generator 5, the shoe 151 moves to the left along the slide-wire resistance 130, thus establishing a new balance between the two legs of the Wheatstone bridge, at which point current will cease to flow through the armature 150 of the relay 148, bringing the vane back to a position over the insulation 164. The circuit of motor 171 is thus broken and the motor stops.

In order to insure a constant rate of welding strip feed, and a constant potential source of current for exciting the field 20 of welding generator 5 and the field 39 of speed-corrective generator 4, I employ the constant frequency controller 77, comprising the frame 78, of iron or other magnetic material, the reed 79, the carbon pile 80 and the magnet winding 81. The operation of this device is as follows: Current from the positive line 7 flows through line 88, line 87, line 86, through primary winding 74 of transformer 71, line 75, line 76, magnet winding 81, line 83, frame 78, reed 79, carbon pile 80, line 82, to negative line 18. The energization of the magnet winding 81 causes the magnet to attract the reed 79, reducing the pressure applied to the carbon pile 80, increasing the resistance of the circuit which includes the magnet winding and the carbon pile, and reducing the pull of the magnet 81. Thereupon the reed 79 is released, and again compresses the carbon pile 80, the resistance of the circuit is decreased, and the pull of magnet 81 is increased, again attracting the reed 79. The reed 79 will thus vibrate at a constant frequency, which can be regulated to any desired value by adjusting the weight 85. The pressure upon the carbon pile 80 may be regulated by the adjusting screw 84.

Alternating current from the secondary winding 70 of transformer 71 is delivered by lines 72, 73 and 74 to the field of generator 55, driven by direct-current motor 65, to which current is delivered as follows: positive line 7, line 66, line 67, through motor 65, line 68, to negative line 18. The energization by alternating current of the field windings of generator 55 causes the commutating armature of said generator to deliver alternating current at a fixed frequency. This alternating current is delivered by the following circuit: from one terminal of the armature by line 56, line 57, line 58, line 59, through field windings 48 of synchronous regulator 46, line 61, line 62, line 63, line 64 to the opposite terminal of armature of generator 55; also by the following circuit: from one terminal of armature of generator 55, through line 56, line 89, through armature of synchronous motor 90, line 91, line 63, line 64, to the opposite terminal of armature of generator 55. This synchronous motor 90 drives, through suitable gear and shaft connections, the feed roll 123, which, with its coacting feed roll 124, feeds the welding strip 10 to supply metal to be fused by the arc. The field of this synchronous motor 90 is supplied with direct current as follows: positive line 7, line 93, field winding 92, line 94, line 95, to negative line 18.

While this plan of correcting for changes in temperature of the reactance coil 17 does in fact result in a variation in the voltage of the welding generator, it is within the contemplated meaning of the expression "constant potential source" in certain of my claims, because it is equivalent to constant potential and a reactance of constant resistance—and this is the effect sought.

In Fig. 1 I have shown a system wherein constancy of welding strip feed is assured, and, by independent means, constancy of welding current potential is obtained, under the condition of variable generator speed. However, my present method of arc control is operative even though the potential of the welding current varies with the generator speed, provided the speed of the welding-strip feeding motor be correlated to the welding generator speed so that it correctly varies in response to such speed changes. It will be understood that in either case changes due to temperature variations, whether in the welding generator or in the welding circuit external to the arc, should preferably be either prevented or compensated for.

In Fig. 2 I show such a modification as I have just referred to, wherein the rate of welding-strip feed is correlated to the speed of the welding generator, so that changes in generator speed are compensated for by corresponding changes in welding-strip feed, instead of by changes in the field strength of the welding generator. This I accomplish by mounting upon the shaft of the welding motor-generator set a small alternating current generator $4^a$ which supplies current through lines 6 and 7 to the armature of the synchronous motor 90 (the field of which motor is energized by direct current from the mains 18 and 19), driving the welding-strip feeding mechanism. Current from mains 1 and 2 drives the motor 3 which furnishes power for driving the welding generator 5, which supplies welding current from positive pole through line 14, line 15, through an arc adapted to be struck between the work and the welding-strip 10, welding-strip 10, line 13, line 12, resistance 16, reactance 17, line 11, to negative pole of generator 5. The alternating current from generator $4^a$ varies in frequency with changes in speed of the motor-generator shaft, thus producing a corrective change in the speed of the synchronous welding-strip feeding motor 90.

In Fig. 3 I show still another system applicable to my present method of arc control, wherein changes in the potential of the welding current, due to variations in generator speed, may also be prevented by driving the welding generator with a synchronous motor, the source of alternating current for which motor would, in this case, be the same as for the synchronous motor driving the welding-strip feeding mechanism. Alternating current from the mains $1^a$ and $2^a$ is delivered by lines 6 and 7 to the armature of synchronous motor $3^a$, the field of which motor is supplied from any direct current source. Alternating current from mains 1ª and 2ª is also delivered to the armature of the synchronous welding-strip feeding motor 90, the field of which motor is energized by direct current from the mains 18 and 19. The synchronous motor 3ª drives the welding generator 5 at constant speed, which speed is the same as that of the welding-strip feeding motor 90.

It will be understood that variations in the potential of the welding current due to changes in temperature of the welding generator 5 of Figs. 2 and 3 are to be prevented either by the means shown in Fig. 1, or in some other suitable manner.

Changes in the resistance of reactance 17 of Figs. 2 and 3, due to temperature variations, may be compensated for in the manner shown in Fig. 1; or the temperature of the reactance in all three systems may be prevented from varying by artificial cooling, as, for example, by immersion in an oil bath.

The same provision is made in the systems illustrated in Figs. 2 and 3, with reference to capacity of cables carrying the welding current, and the employment of zero temperature coefficient ballistic resistance material, in order to prevent changes in the resistance of the welding circuit external to the arc, as applies to the system of Fig. 1.

In carrying out my present method of arc control, I employ arc-striking devices, switches and other accessories well known to those skilled in the art.

The performance of this low voltage stable arc is unique in that the metal always appears as though deposited by a jet under the influence of pressure. I have not, thus far, worked with an arc voltage lower than 8 volts, but the performance of the arc at that voltage did not indicate that the lower limit had been reached. It is possible, with this method of control, to continuously maintain an arc much shorter and of lower voltage than with any other control method with which I am familiar. There is a freedom from sputtering in the arcs which I have used with this method, between 8 and 16 volts, and a smoothness both of operation and of metal deposit, as well as an absence of any tendency to burn, which are quite different from anything which I have previously observed in many years' experience with arc welding machines and systems. At the same time, high welding speeds are easily attained, as, for example, 24 to 48 inches per minute with 16 to 20 gauge metal.

What I claim and desire to secure by Letters Patent of the United States is:

1. The method of electric arc welding which consists in automatically feeding a welding strip toward the work at a constant rate and so proportioning the voltage of the welding circuit external to the arc to the voltage applied to the welding circuit as to produce a normal arc voltage in excess of one-half the impressed voltage.

2. The method of arc welding which consists in expending energy in a welding arc at a materially greater rate than in the welding circuit external to the arc, and feeding a welding strip at a constant rate corresponding to the energy dissipation in the arc when at its desired length.

3. The method of stabilizing a welding arc which consists in employing in the welding circuit external to the arc a resistance of a value less than one-half the total resistance of the welding circuit and continuously feeding the welding strip toward the work at such a constant rate as to result in variations in the arc length producing corrective changes in the wattage consumption at the arc.

4. In the method of arc welding wherein a welding strip is automatically fed at a constant rate, the improvement which consists in establishing a short arc with high current density in the welding strip, and correcting variations in the arc resistance by the direct action of wattage changes in the arc resulting therefrom.

5. In electric arc welding, means for producing a constant potential source of welding current, means for continuously feeding a welding pencil to the work at a constant rate corresponding to the normal fusing rate, and resistance included in series with the arc so correlated to the impressed voltage and the feeding rate of the welding strip as to cause changes in arc length to produce variations in arc wattage tending to correct such changes in arc length.

6. In the art of arc welding, the improvement which consists in automatically moving a welding strip and the work to be welded relatively to each other, feeding the welding strip at a constant rate, proportioning the circuit constants to cause a materially greater wattage consumption in the arc than in the welding circuit external thereto, and correlating the applied voltage to said feeding rate to maintain a short arc of approximately constant length.

7. In the art of arc welding, the improvement which consists in moving the welding strip and the work relatively to each other, feeding the welding strip at such a constant rate as to result in the desired normal arc length, and regulating the arc length by correlating the impressed voltage and the resistance of the welding circuit external to the arc to give a corrective rate of change of arc wattage per volt change of arc voltage with a high current density in the welding strip.

8. In the art of arc welding, the improvement which consists in moving the welding strip and the work relatively to each other, feeding the welding strip at such a constant rate as to result in the desired normal arc length, and regulating the arc length by correlating the impressed voltage and the resistance of the welding circuit external to the arc to give a corrective rate of change of arc wattage per volt change of arc voltage.

9. The method of arc welding which consists in establishing a short arc between the work to be welded and a welding strip carrying a high current density, feeding the welding strip at a constant rate, effecting relative movement between the work and the welding strip, and so correlating the voltage impressed upon the welding circuit to the resistance of the welding circuit external to the arc as to compensate for changes of arc length by variations of power resulting therefrom.

10. In the method of arc welding wherein a welding strip is continuously fed to the work, the improvement which consists in feeding the welding strip at a substantially constant rate, effecting relative movement between the work and the welding strip, and so correlating the impressed voltage and the resistance of the welding circuit external to the arc as to cause departures from the normal arc length to be corrected by the wattage changes resulting therefrom.

11. In the method of arc welding wherein a welding strip is automatically fed at a substantially constant rate, the improvement which consists in establishing a short arc with high current density in the welding strip, including in the circuit exterior to the arc a resistance materially less than the normal arc resistance, and impressing upon the circuit a substantially constant voltage of such value that the normal rate of fusion corresponds to the rate of feed, and that variations of arc length are corrected by accompanying changes in the fusing rate.

12. The method of electric arc welding which consists in establishing a short arc between the work to be welded and a welding strip carrying a high current density, continuously feeding said strip toward the work, supplying to the welding circuit current at a substantially constant potential through connections including a reactance and a resistance, and so correlating said resistance to the feeding rate that thermal variations accompanying changes in arc length automatically act to restore the arc to normal length.

13. The method of arc welding which consists in striking an arc between the work and a welding strip, effecting relative movement between said work and strip, feeding the welding strip at a constant rate to produce an arc of the desired normal length, supplying welding current from a constant potential source to the arc, and so correlating the circuit voltage to the resistance external to the arc as to correct departures from a normal rate of fusion by the wattage changes in the arc resulting therefrom.

14. The method of arc welding which consists in striking an arc between the work and a welding strip, effecting relative movement between said work and strip, feeding the welding strip at a constant rate to produce an arc of the desired normal length, supplying welding current from a constant potential source to the arc, and so correlating the circuit voltage to the resistance external to the arc as to cause variations in arc length to be corrected by changes of thermal energy resulting therefrom.

15. The method of arc welding which consists in moving a welding strip and the work to be welded relatively to each other, feeding the welding strip at such a constant rate as to produce an arc of the desired normal length, and correlating the impressed voltage and the resistance of the welding circuit external to the arc to establish such a definite relation between variations in the wattage and voltage of the arc as to maintain a stable low voltage arc of substantially constant length.

16. In the art of arc welding, the improvement which consists in impressing upon the welding circuit a substantially constant voltage and so correlating such impressed voltage to the resistance of the welding circuit external to the arc as to compensate for changes of arc length by variations of power in the arc resulting therefrom.

17. In an electric arc welding apparatus, an electric generator for supplying electric energy to the welding circuit and progressively acting means for prevnting variations in speed of the welding generator from producing substantial changes in the voltage impressed upon the welding circuit.

18. In an electric arc welding apparatus, an electric generator for supplying electric energy to the welding circuit, and progressively acting means for preventing variations in temperature of the welding generator field from producing substantial changes in the voltage impressed upon the welding circuit.

19. In an electric arc welding apparatus, an electric generator for supplying electric energy to the welding circuit, and means responsive to variations in temperature of the welding generator field for preventing changes in voltage impressed upon the welding circuit.

20. The method of metallic arc welding which consists in producing a constant potential welding current, continuously feeding a welding strip constituting one electrode toward the work constituting the other electrode, and so correlating the resistance of the circuit external to the arc to the impressed voltage as to cause variations in arc length to produce inverse changes in heat available at the arc.

21. In an arc welding apparatus, means for producing a constant potential welding current, a resistance of a value less than the normal arc resistance included in the welding circuit, and means for continuously feeding the welding strip at a constant rate to maintain the arc.

22. In an electric arc welding apparatus, a constant potential source of welding current, means for continuously feeding a welding pencil to the work at a constant rate corresponding to the normal fusing rate, and resistance in the welding circuit external to the arc so related to the voltage impressed upon the welding circuit as to cause variations in arc wattage to compensate for changes in arc length.

23. In a welding apparatus, a source of direct current, an alternating current motor for feeding a welding strip constituting one electrode toward the work constituting the other electrode, and means comprising a constant frequency controller for supplying alternating current to said motor.

24. In an arc welding apparatus, an electric generator for supplying welding current to the arc, means comprising a constant frequency vibrator for producing a pulsating current, and means controlled by said pulsating current for feeding forwardly the welding strip at a constant rate.

25. In an arc welding apparatus, an electric generator for supplying welding current to the arc, means comprising a constant frequency vibrator deriving its current from the welding circuit for producing a pulsating current, and means controlled by said pulsating current for feeding forwardly the welding strip at a constant rate.

26. In an arc welding apparatus, an electric generator for supplying welding current to the arc, means comprising a constant frequency vibrator for producing a pulsating current, and means controlled by said pulsating current for varying the field of said generator in accordance with its speed to maintain substantially constant voltage on the welding circuit.

27. In an arc welding apparatus, an electric generator for supplying welding current to the arc, means comprising a constant frequency vibrator for producing a pulsating current, and means controlled by said pulsating current for feeding forwardly the welding strip at a constant rate and varying the field of said generator in accordance with its speed to maintain a substantially constant impressed voltage on the welding circuit.

28. The improvement in that method of electric arc welding wherein a metallic welding pencil constituting one electrode is fed toward the work constituting the other electrode which consists in continuously feeding the welding pencil at a constant rate and in controlling the arc by the direct action of its fusing energy.

HARRY D. MORTON.